United States Patent
Pocha et al.

(10) Patent No.: US 9,788,273 B2
(45) Date of Patent: Oct. 10, 2017

(54) METHOD AND SYSTEM FOR PAGING RECEPTION OPTIMIZATION IN LTE DIRECT DEVICES

(71) Applicant: Samsung Electronics Co., Ltd., Gyeonggi-do (KR)

(72) Inventors: Thejeswara Reddy Pocha, Bangalore (IN); Suresh Kumar Garikipati, Bangalore (IN); Nitesh Pushpak Shah, Bangalore (IN); Jaya Prakash Sivapuram, Bangalore (IN)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 14/870,989

(22) Filed: Sep. 30, 2015

(65) Prior Publication Data

US 2016/0269994 A1  Sep. 15, 2016

(30) Foreign Application Priority Data

Mar. 12, 2015  (IN) ............................ 1231/CHE/2015

(51) Int. Cl.
*H04W 52/02* (2009.01)
*H04W 68/02* (2009.01)
*H04W 4/00* (2009.01)

(52) U.S. Cl.
CPC ....... *H04W 52/0229* (2013.01); *H04W 4/005* (2013.01); *H04W 68/02* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,706,122 | B2* | 4/2014 | Vikberg | H04W 68/12 455/439 |
| 2009/0221303 | A1* | 9/2009 | Soliman | H04W 52/0274 455/458 |
| 2013/0015953 | A1* | 1/2013 | Hsu | H04W 4/005 340/7.46 |
| 2013/0095862 | A1* | 4/2013 | Bejerano | H04W 68/02 455/458 |
| 2013/0150014 | A1* | 6/2013 | Gong | H04W 8/183 455/418 |
| 2013/0273923 | A1 | 10/2013 | Li et al. | |
| 2013/0287012 | A1 | 10/2013 | Pragada et al. | |
| 2013/0331077 | A1* | 12/2013 | Mucke | H04W 76/06 455/418 |
| 2014/0087744 | A1* | 3/2014 | Yang | H04W 76/043 455/450 |
| 2014/0098719 | A1 | 4/2014 | Kim et al. | |
| 2014/0328329 | A1* | 11/2014 | Novlan | H04W 72/042 370/336 |

(Continued)

*Primary Examiner* — Eunsook Choi
(74) *Attorney, Agent, or Firm* — The Farrell Law Firm, P.C.

(57) ABSTRACT

A method and a wireless network system are provided for paging reception optimization in a first terminal. The method includes establishing, by the first terminal, a Device-to-Device (D2D) communication with a second terminal; receiving, by the first terminal, paging information from the second terminal; receiving, by the first terminal, a paging message from a network; and sending a paging notification to the second terminal upon receiving a paging message for the second terminal.

16 Claims, 4 Drawing Sheets

(56) References Cited

U.S. PATENT DOCUMENTS

| | | | |
|---|---|---|---|
| 2014/0334392 A1* | 11/2014 | Gage | H04L 5/0092 |
| | | | 370/329 |
| 2016/0142974 A1* | 5/2016 | Lindoff | H04B 1/40 |
| | | | 370/311 |
| 2016/0227547 A1* | 8/2016 | Su | H04W 76/048 |
| 2016/0316451 A1* | 10/2016 | Hsu | H04W 4/005 |

* cited by examiner

METHOD AND SYSTEM FOR PAGING RECEPTION OPTIMIZATION IN LTE DIRECT DEVICES

PRIORITY

This application claims priority under 35 U.S.C. §119(a) to an Indian Patent Application filed on Mar. 12, 2015 in the Indian Patent Office and assigned Serial No. 1231/CHE/2015, the entire disclosure of which is incorporated herein by reference.

BACKGROUND

1. Field of the Disclosure

The present disclosure relates generally to Device to Device (D2D) communication in Long Term Evolution (LTE) devices, and more particularly, to a method and system for paging reception optimization in LTE Direct devices.

2. Description of the Related Art

A wireless system enables communication between two or more wireless entities such as fixed or mobile communication devices, base stations, servers and/or other devices capable of wireless communication. A wireless communication device is provided with an appropriate signal receiving and transmitting arrangement for enabling communication of voice and data. A wireless communication device is often referred to as a User Equipment (UE) or terminal.

A feature of the wireless system is paging for wireless devices. In accordance with the 3rd Generation Partnership Project (3GPP) protocol specification, a base station site, referred to as an enhanced Node B (eNB), broadcasts paging parameters including a paging cycle and information for use in a calculation of paging occasions via System Information (SI) signaling. After a communication device receives the information, it calculates a corresponding Paging Frame (PF) and a Paging Occasion (PO), based on its User Equipment Identity (UE ID) and the received parameters according to a predefined rule. When a paging message originates from the core network, the eNB calculates a paging frame and a paging occasion in the same way and delivers a paging message in these slots so that the communication device is able to detect the message.

In the related art, techniques to extend battery life by conserving battery power in mobile devices become increasingly important as mobile device use expands. The battery life is one of the most salient contributors to overall product experience. Even so, battery components are typically the largest and heaviest components of a mobile device.

All UE's monitor both network paging and direct paging (e.g. D2D communication), thereby draining battery power at the UE's. Therefore, there exists a need for providing a method and system for paging reception optimization in LTE Direct devices to reduce power consumption.

SUMMARY

The present disclosure has been made to address at least the above-mentioned problems and/or disadvantages, and to provide at least the advantages described below. Accordingly, an aspect of the present disclosure provides a method and system for reducing paging reception optimization in LTE Direct devices.

BRIEF DESCRIPTION OF THE DRAWINGS

The above and other aspects, features, and advantages of the present disclosure will be more apparent from the following description, taken in conjunction with accompanying drawings, in which.

DETAILED DESCRIPTION OF EMBODIMENTS OF THE PRESENT DISCLOSURE

Figure 1:
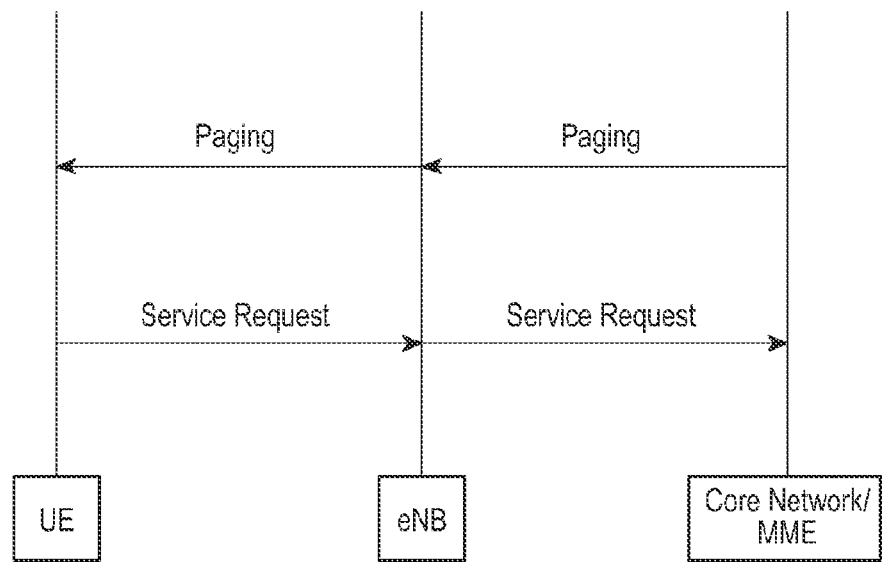
FIG. 1 is a schematic diagram illustrating an LTE paging mechanism.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, reference may be made to "an," "one," or "some" embodiment(s). This does not necessarily imply that each such reference is to the same embodiment(s), or that the feature only applies to a single embodiment. Single features of different embodiments may also be combined to provide other embodiments.

As used herein, the singular forms "a," "an," and "the" are intended to include the plural forms as well, unless expressly stated otherwise. It will be further understood that the terms "includes," "comprises," "including," and/or "comprising," when used herein, specify the presence of stated features, integers, steps, operations, elements, and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having meanings that are consistent with their meaning in the context of the relevant art, and will not be interpreted in an idealized or overly formal sense unless expressly so defined herein.

FIG. 1 is a schematic diagram illustrating an LTE paging mechanism. Paging in idle mode is a procedure to transmit a paging message to a User Equipment (UE) (e.g. a terminal). A paging message is triggered either by a Mobile Management Entity (MME) in a core network or an eNB in a Universal Terrestrial Radio Access Network (UTRAN). A paging procedure could be initiated from a network to inform a UE through a paging message about an Incoming call/Incoming Short Message Service (SMS) from a Circuit Switched (CS) domain or a Packet Switched (PS) domain, a change of Broadcast Control Channel (BCCH) information, a releasing of a Radio Resource Control (RRC) connection, or Earthquake and Tsunami Warning Service (ETWS) information.

A core network originated paging message is for informing the UE about an Incoming Call or an Incoming SMS either from a CS or a PS domain. A UTRAN originated paging message is for informing a UE about a change of BCCH information, a releasing of an RRC connection or ETWS information. In LTE, the UE must monitor a Physical Downlink Control Channel (PDCCH) continuously to listen for a paging message, and this drains UE battery power significantly. Instead, if the UE is allowed to monitor PDCCH at a predetermined period (e.g. every 60 ms or 100 ms), it will reduce the UE's power consumption. The process of monitoring PDCCH discontinuously to listen for a paging message during an idle state is known as Discontinuous Reception (DRX). UEs in idle mode monitor the PDCCH channel for a Paging-Radio Network Temporary Identifier (P-RNTI) used for paging to receive a paging message from an eNB. The UE must monitor the PDCCH only at a certain UE paging occasion, i.e. only at a certain sub-frame in a certain radio frame, where these paging occasions are configured by a Base Station (BS or eNB). A UE automatically wakes up during a paging occasion to check if there is any paging intended for the UE, and during other times, the UE enters a sleep mode to save battery power.

Further, a paging frame and a paging occasion for an UE to receive paging messages is described below. A Paging Frame (PF) is a Radio Frame in which a UE looks for a paging message, where a PF may contain one or multiple paging occasions. Whereas, a Paging Occasion (PO) is a sub-frame where a P-RNTI may be transmitted on a PDCCH addressing the paging message for the UE. There is only one paging occasion for each UE in a DRX cycle. To determine a paging frame and a paging occasion, a UE uses DRX parameters broadcasted in the system information SIB2.

A Paging Frame is determined by the following Equation (1):

$$PF = SFN \text{ modulo } T = (T/N)*(UE\_ID \text{ modulo } N), \quad (1)$$

where UE_ID is defined in Equation (2) below.

$$UE\_ID = IMSI \text{ modulo } 1024, \quad (2)$$

where IMSI stands for "International Mobile Subscriber Identity," and where N is defined in Equation (3) below.

$$N = \min(T, nB), \quad (3)$$

where "min(a,b)" is a function that returns the minimum of the values of "a" and "b," where T is a default Paging Cycle broadcast in System Information Block 2 (SIB2), and where nB is broadcast in SIB2.

For example, if T is 128 (e.g., 1 rf (radio frame)), nB is 128 (e.g., 1 T), and IMSI is 262022008880275, then PF is (128/128)((262022008880275 modulo 1024) modulo 128)=1x(147 modulo 128)=19.

A Paging Occasion is determined by calculating an index i_s, and using the result to lookup the Paging Occasion in a table using Equation (4) as follows:

$$i\_s = \text{floor}(UE\_ID/N) \text{ modulo } Ns, \quad (4)$$

where Ns is defined in Equation (5) below.

$$Ns = \max(1, nB/T), \quad (5)$$

where "floor(x)" is a function that returns the greatest integer less than x, and where "max(a,b)" is a function that returns the maximum of the values of "a" and "b."

For example, if T is 128, nB is 128, and the IMSI of the UE_ID is 262022008880275 then i_s=floor((262022008880275 modulo 1024)/N) modulo (max(1, 128))=floor(147/128) modulo 1=1. From the table of i_s indexes, the Paging Occasion for i_s=1 is 9.

Figure 2:
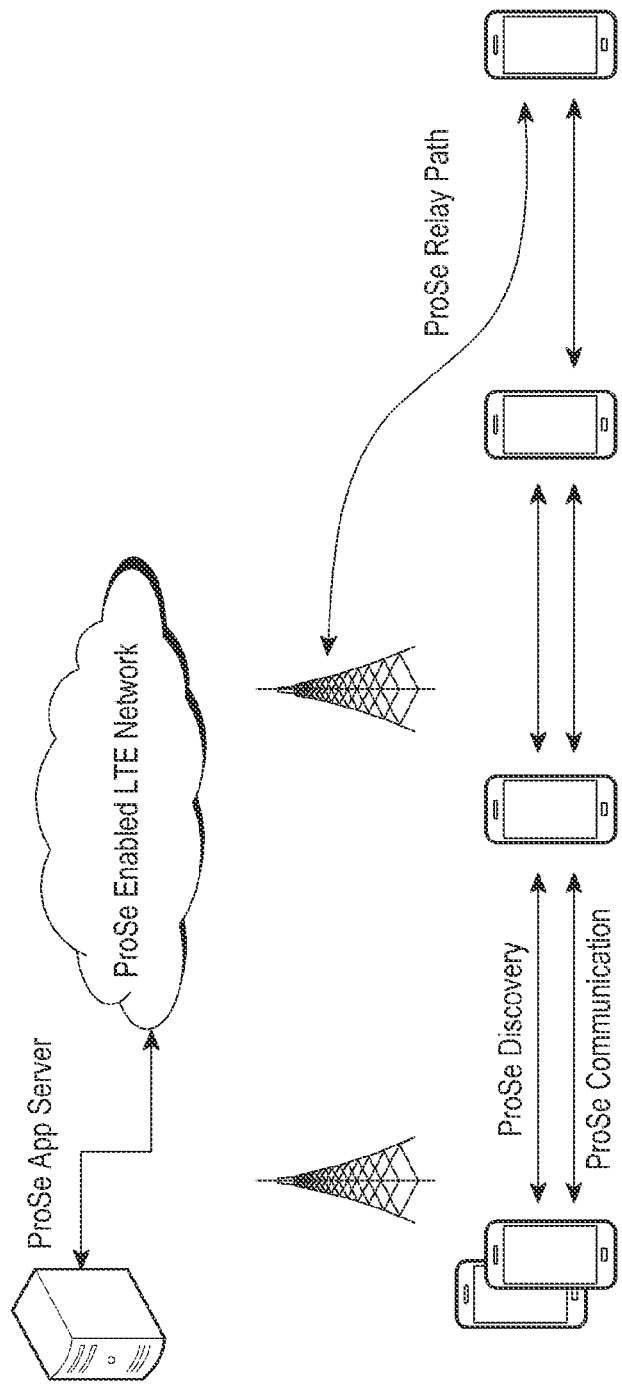
FIG. 2 is a schematic diagram illustrating a ProSe service (e.g. LTE Direct) architecture.

FIG. 2 is a schematic diagram illustrating a Proximity Services (ProSe) (e.g. LTE Direct) architecture. The LTE Direct devices discover each other and set up the communication path as defined by 3GPP. The proximity services in 3GPP include the two basic functions comprising D2D discovery and D2D communication.

D2D discovery precedes D2D communication in time, while D2D communication may use information acquired during D2D discovery. D2D discovery enables UE to use the LTE air interface to identify other UE devices that are in proximity. After which, a communication path, a direct link without routing via eNB(s) and possibly core network, is set up between the LTE devices.

Figure 3:
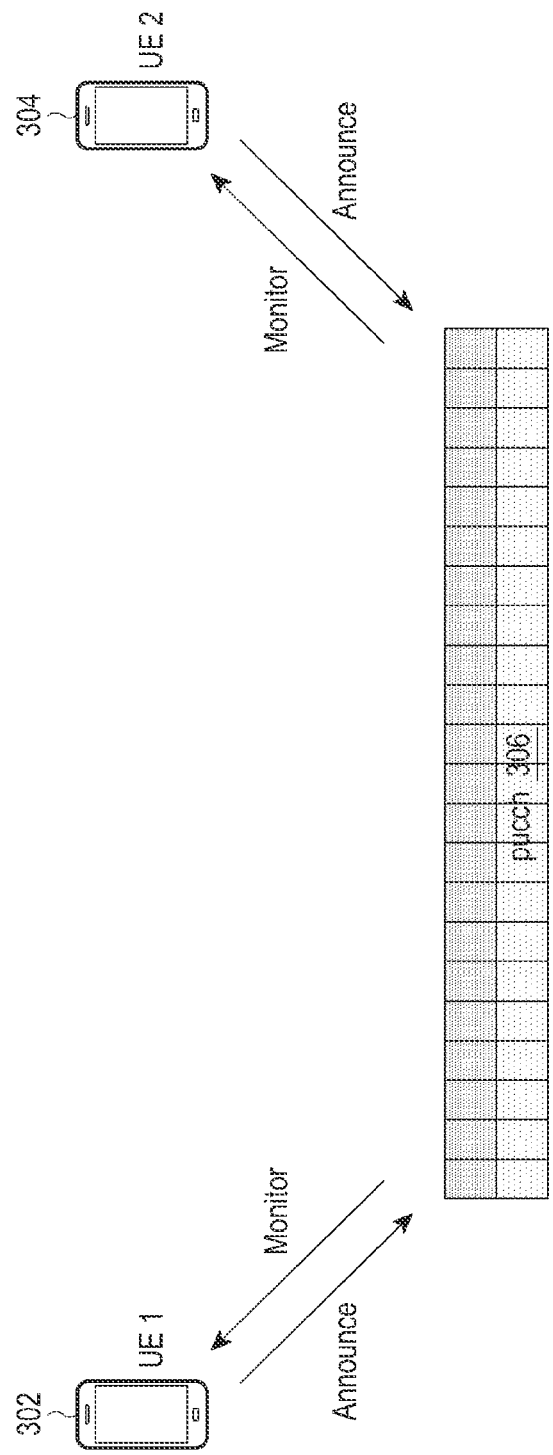
FIG. 3 is a schematic diagram illustrating direct paging pattern detection using expression codes, according to an embodiment of the present disclosure.

FIG. 3 is a schematic diagram illustrating direct paging pattern detection using expression codes, according to an embodiment of the present disclosure. Two UE's, UE1 302 and UE2 304, communicate with each other over a shared Physical Uplink Control Channel (PUCCH) 306. The UE1 302 and the UE2 304 each announces or monitors the expression code in its PUCCH channel 306 allocated by a network. The UE1 302 and the UE2 304 share the Paging Occasion, System architecture evolution Temporary Mobile Subscriber Identity (S-TMSI), Tracking Area (TA) list with each ProSe path that is established between the two UE's.

Figure 4:
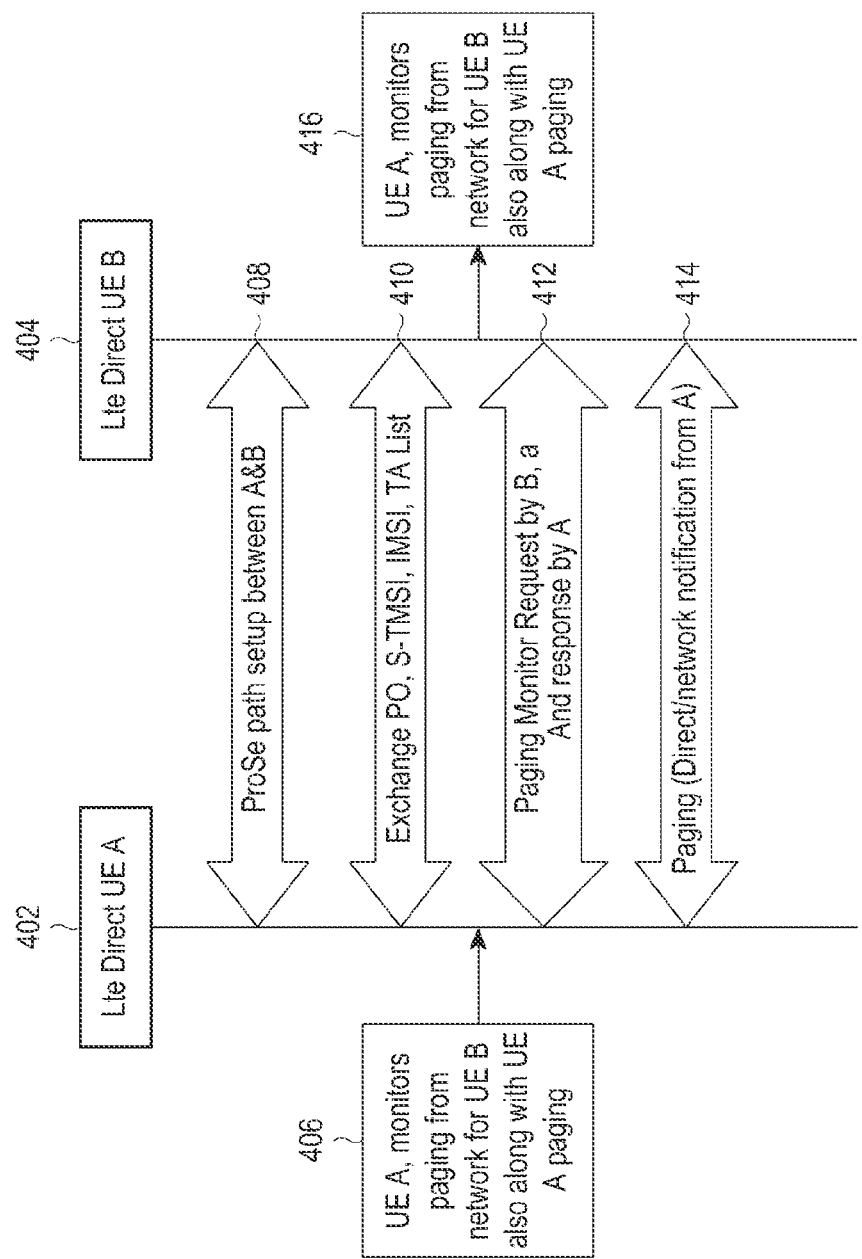
FIG. 4 is a flow drawing illustrating a paging monitoring setup procedure in LTE Direct devices, according to an embodiment of the present disclosure.

FIG. 4 is a schematic diagram illustrating a paging monitoring setup procedure in LTE Direct devices, according to an embodiment of the present disclosure. In step 408, a Device-to-Device (D2D) communication is established between a first user equipment (UE1) 402 and a second user equipment (UE2) 404.

In step 410, the direct communication path between the first user equipment (UE1) 402 and the second user equipment (UE2) 404 is used to share paging information such as the paging cycle of each device, S-TMSI to compare the paging and the TA list of each device. Criteria such as a device with more battery power left and a device receiving the most paging messages is used to select a paging monitoring device.

One of the user equipment devices 402, 404 is selected for monitoring, while the other device stops monitoring its network paging channel, where the other device monitors only the direct channel to receive notification of network paging information from the monitoring device in step 412.

According to an embodiment of the present disclosure, stopping the monitoring of the network paging in one of the devices consumes less power and one of the devices still monitors the direct communication path setup between both devices. When the paging monitoring device receives a paging message from the network, it checks if the paging message is intended for it or for the other device.

In step 414, if the paging message is intended for the other device, the paging monitoring device notifies the other device by changing the expression code in direct link.

With the detection of a change in an expression code, the other device establishes an RRC connection with an eNB to receive the incoming communication (such as data/a call). If either of the UEs moves to a different network area i.e., a different TA, both UEs update the TA list of each other. If any of the UEs is no longer associated with the same TA list, the paging monitoring for the other device is terminated. The device implicitly detects the change in paging monitoring procedure.

The present disclosure includes a chip set for paging optimization in a terminal, where the chip set establishes, by the first terminal, a communication with a second terminal;

receives, by the first terminal, paging information from the second terminal; receives, by the first terminal, a paging message from a network; and sends a paging notification to the second terminal upon receiving a paging message for the second terminal.

In the first terminal, the paging information associated with the second terminal includes a paging occasion; a System architecture evolution Temporary Mobile Subscriber Identity (S-TMSI); and a Tracking Area (TA) list.

The chip set also notifies, by the first terminal, the second terminal of the received paging message by changing a coding scheme in the D2D communication and compares, by the first terminal, the S-TMSI in the paging message from the network to determine if the paging message is for the first terminal or the second terminal.

The chip set performs paging monitoring by the first terminal, wherein the chip set consumes a sufficiently high battery power by the first terminal.

The chip set updates, by the first terminal, the TA list if the first terminal moves to a different network.

In accordance with an aspect of the present disclosure, a method is provided for reducing paging reception optimization in LTE direct devices. The method includes establishing by a first user equipment (UE1), a Device-to-Device (D2D) communication with a second user equipment (UE2), sharing paging information with the first UE by second UE, receiving by a first UE, a paging message from the network, sending a paging notification to the second UE on receiving a paging message for the second UE, and establishing by the second UE, an Radio Resource Control (RRC) connection with the network on receiving the paging notification from the first UE.

In accordance with another aspect of the present disclosure, the paging information associated with the second UE includes a paging occasion, a Temporary Mobile Subscriber Identity (S-TMSI), and a Tracking Area (TA) list.

In accordance with another aspect of the present disclosure, the first UE notifies reception of the paging message to the second UE by changing a coding scheme in the D2D communication. The first UE compares the S-TMSI in the paging message from the network to determine if the paging message is for the first UE or the second UE.

In accordance with another aspect of the present disclosure, a wireless network system is disclosed. The system includes a LTE-based network, a first user equipment (UE1) in communication with the LTE based network, and a second user equipment (UE2) in a Device to Device (D2D) communication with the first UE, wherein the first UE is adapted to monitor a paging message for the first and second UE from the LTE network, and sending a paging notification to the second UE on receiving a paging message for the second UE from the LTE network.

In accordance with another aspect of the present disclosure, the D2D communication can be enabled on any type of network comprising, but not limited to, WiFi, Bluetooth, ZigBee, NFC, WiMAX, LTE, HSPA, EV-DO and the like.

The embodiments of the present disclosure have been described with reference to certain embodiments. It will be evident that various modifications and changes may be made to these embodiments without departing from the scope and spirit and scope of the present disclosure. Furthermore, the various devices, modules, and the like described herein may be enabled and operated using hardware circuitry, firmware, and/or software embodied in a non-transitory computer-readable recording medium.

Although the present disclosure is described with certain embodiments, it will be obvious to a person skilled in the art to practice the present disclosure with modifications. However, all such modifications are deemed to be within the scope of the present disclosure, as defined by the appended claims, and their equivalents.

What is claimed is:

1. A method of providing paging optimization in a first terminal, the method comprising:
   establishing, by the first terminal, a communication with a second terminal;
   receiving, by the first terminal, paging information from the second terminal;
   receiving, by the first terminal, a paging message from a network; and
   sending a paging notification to the second terminal upon receiving a paging message for the second terminal,
   wherein the paging information associated with the second terminal comprises:
   a paging occasion;
   a system architecture evolution temporary mobile subscriber identity (S-TMSI); and
   a Tracking Area (TA) list.

2. The method of claim 1, wherein the first terminal notifies the second terminal of the received paging message by changing a coding scheme in D2D communication.

3. The method of claim 1, wherein the first terminal compares the S-TMSI in the paging message from the network to determine if the paging message is for the first terminal or the second terminal.

4. The method of claim 1, wherein the first terminal is a paging monitoring device.

5. The method of claim 1, wherein the first terminal is of a sufficiently high battery power.

6. The method of claim 1, further comprising:
   updating, by the first terminal, the TA list if the first terminal moves to a different network.

7. A wireless network system, comprising:
   a Long Term Evolution (LTE) based network;
   a first terminal in communication with the LTE based network; and
   a second terminal in a communication with the first terminal;
   wherein the first terminal is configured to:
   monitor a paging message for the first terminal and the second terminal from the LTE based network;
   receive paging information from the second terminal; and
   send a paging notification to the second terminal upon receiving a paging message for the second terminal from the LTE based network, and
   wherein the paging information comprises:
   a paging occasion;
   a system architecture evolution temporary mobile subscriber identity (S-TMSI); and
   a Tracking Area (TA) list.

8. The wireless network system of claim 7, wherein the second terminal is configured to establish a Radio Resource Control (RRC) connection with the LTE based network upon receiving the paging notification from the first terminal.

9. The wireless network system of claim 8, wherein the second terminal is configured to monitor the D2D communication with the first terminal.

10. The wireless network system of claim 8, wherein the first terminal is configured to send the paging message by changing a coding scheme in the communication with the second terminal.

11. A first terminal comprising a chip set for paging optimization, the chip set configured to:

establish, by the first terminal, a communication with a second terminal;
receive, by the first terminal, paging information from the second terminal;
receive, by the first terminal, a paging message from a network; and
send a paging notification to the second terminal upon receiving a paging message for the second terminal,
wherein the paging information comprises:
a paging occasion;
a system architecture evolution temporary mobile subscriber identity (S-TMSI); and
a Tracking Area (TA) list.

12. The first terminal of claim 11, wherein the chip set is further configured to notify, by the first terminal, the second terminal of the received paging message by changing a coding scheme in D2D communication.

13. The first terminal of claim 11, wherein the chip set is further configured to compare, by the first terminal, the S-TMSI in the paging message from the network to determine if the paging message is for the first terminal or the second terminal.

14. The first terminal of claim 11, wherein the chip set is further configured to perform paging monitoring by the first terminal.

15. The first terminal of claim 11, wherein the chip set is further configured to consume a sufficiently high battery power by the first terminal.

16. The first terminal of claim 11, wherein the chip set is further configured to update, by the first terminal, the TA list if the first terminal moves to a different network.

* * * * *